United States Patent [19]

Oehsen et al.

[11] Patent Number: 4,693,877

[45] Date of Patent: Sep. 15, 1987

[54] CLEAVAGE OF FORMAMIDE TO GIVE HYDROCYANIC ACID AND WATER

[75] Inventors: Ubbo v. Oehsen, Frankenthal; Karlheinz Stecher, Ludwigshafen; Waldemar Koehler, Frankenthal; Berthold Mueller, Bensheim; Fritz Brunnmueller, Limburgerhof; Rolf Schneider, Mannheim, all of Fed. Rep. of Germany

[73] Assignee: BASF Aktiengesellschaft, Ludwigshafen, Fed. Rep. of Germany

[21] Appl. No.: 886,317

[22] Filed: Jul. 17, 1986

[51] Int. Cl.$^4$ ............................................. C01C 3/04
[52] U.S. Cl. ................................................... 423/373
[58] Field of Search ........................................ 423/373

[56] References Cited

U.S. PATENT DOCUMENTS

| | | | |
|---|---|---|---|
| 1,675,366 | 7/1928 | Magill et al. | 423/373 |
| 1,712,297 | 5/1929 | Fick | 423/373 |
| 1,876,213 | 9/1932 | Ewan | 423/373 |
| 1,951,520 | 3/1934 | Munch et al. | 423/373 |
| 2,042,451 | 6/1936 | Bond et al. | 423/373 |
| 2,534,000 | 12/1950 | Coopey | 423/373 |
| 2,604,380 | 7/1952 | Beekhuis . | |

FOREIGN PATENT DOCUMENTS 458145 7/1949 Canada ............................... 423/373
586861 10/1933 Fed. Rep. of Germany .

Primary Examiner—John Doll
Assistant Examiner—Wayne A. Langel
Attorney, Agent, or Firm—Oblon, Fisher, Spivak, McClelland, & Maier

[57] ABSTRACT

A process for the thermolytic cleavage of formamide to give hydrocyanic acid and water over alumina or alumina/silica moldings subjected to final sintering or over high temperature corrosion-resistant stainless steel packings in the presence of atmospheric oxygen possesses, in particular, high HCN selectively and a high formamide conversion.

2 Claims, No Drawings

CLEAVAGE OF FORMAMIDE TO GIVE HYDROCYANIC ACID AND WATER

The present invention relates to a process for the thermolytic cleavage of formamide to give hydrocyanic acid and water, over alumina moldings or alumina/silica moldings which have been subjected to final sintering or over high temperature corrosion-resistant stainless steel packings, in the presence of atmospheric oxygen, the said process possessing, in particular, high HCN selectivity and high formamide conversion.

It is known that formamide can be cleaved in the presence of a catalyst, eg. iron oxide/zinc oxide on silica, to give hydrocyanic acid and water in an endothermic reaction. The cleavage reaction giving ammonia and carbon monoxide, which is likewise endothermic and cannot be completely prevented, takes place as a side reaction during this reaction, i.e. an HCN selectivity of 100% cannot be reached.

The disadvantage of the abovementioned catalyst used industrially on a large scale is its relatively low resistance to mechanical abrasion, its poor stability to thermocycling, and the fact that carbon and crack products are deposited on the catalyst in the course of the reaction and cause the activity with regard to formamide conversion and the HCN selectivity to decrease.

It is an object of the present invention to provide stable moldings which permit a high HCN selectivity and a high formamide conversion during continuous operation on a large industrial scale, i.e. have long lives.

We have found that this object is achieved by a process for the cleavage of formamide to give hydrocyanic acid and water, wherein gaseous, superheated formamide together with from 0.1 to 10, preferably from 1 to 3, % by volume of air is introduced into a tube bundle reactor at from 300° to 480° C., preferably from 300° to 400° C., under reduced pressure of from 1 to 350, preferably from 50 to 150, mbar, and passed over moldings subjected to final sintering and consisting of from 50 to 100, preferably from 85 to 95, % by weight of alumina and from 50 to 0, preferably from 15 to 5, % by weight of silica, at from 450° to 590° C., preferably from 500° to 540° C., the mean residence time being from 0.01 to 0.25, preferably from 0.01 to 0.15, sec.

The process according to the invention is strikingly simple. The HCN selectivity is surprisingly high at 96%, and the conversion can be increased to 99% even during continuous operation. A noteworthy advantage of the novel process is the high thermal resistance and corrosion resistance of the moldings used, and their superior abrasion resistance and advantageously high thermoconductivity.

Deactivation of the novel moldings is extremely slow because deposition of crack products which have an inhibiting effect is virtually completely suppressed by the simultaneous introduction of atmospheric oxygen, so that frequent regeneration is not necessary. The intervals at which regeneration of the moldings has to be carried out are increased from the usual length of 4 weeks to 6–10 months.

The extent to which formaldehyde cleavage involves a thermolytic effect at the surface of the moldings is not clear from the reaction mechanism.

In an advantageous procedure, liquid formamide is vaporized in a tube bundle heat exchanger under reduced pressure of from 1 to 350 mbar and at from 160° to 200° C. The formamide vapors are heated to 300°–480° C. in the evaporator tube itself.

According to the invention, from 0.1 to 10, preferably from 1 to 3, % by volume of air is then introduced. This corresponds to about 5–50 of air per kg of formamide vapor. The air can, if required, be introduced in the preheated state. This air feed serves to increase both the formamide conversion and the HCN selectivity and its advantage could not be foreseen since prior art procedures employed gases such as nitrogen or ammonia.

For the actual cleavage, the formamide/air mixture is heated in a multi-tube reactor to 450°–590° C., preferably 500°–540° C., during a residence time of from 0.01 to 0.25, preferably from 0.01 to 0.15, sec, and cleavage is carried out over moldings which have been subjected to final sintering and consist of from 50 to 100, preferably from 85 to 95, % by weight of alumina and from 50 to 0, preferably from 15 to 5, % by weight of silica, to give hydrocyanic acid and water. A pressure of from 1 to 200, preferably from 50 to 150, mbar, is maintained during this procedure.

Alumina and alumina/silica mixtures of the abovementioned composition which have been subjected to final sintering are known per se. They can be prepared, for example, as follow$: freshly precipitated aluminum hydroxide or mixtures of this with silica gel are dried $lightly and then compressed to give the desired moldings, and the latter are calcined at from 1200° to 1600° C., preferably from 1500° to 1600° C., for not less than 10 hours. This gives a dense-sintered, non-porous product.

Possible packings are both stacked and dumped moldings, eg. Raschig rings, Pall rings, pellets, spheres and similar moldings. It is important that the packings permit good heat transfer while exhibiting little pressure loss. Advantageously, the size and geometry of the moldings u$ed depend on the internal diameter of the tubes to be packed with these moldings, as a rule stainless steel or iron tubes having an internal diameter of from 30 to 100 mm. Particularly suitable ratios of the diameter of the molding to the internal diameter of the tube used are from 1:3 to 1:10, preferably from 1:5 to 1:8.

We have also found that the novel process can be carried out just as advantageously if the gaseous mixture defined above is passed, under the conditions defined above, over appropriate moldings consisting of a high temperature corrosion-resistant chromium nickel stainless steel composed of from 18 to 21% by weight of chromium, from 9 to 13% by weight of nickel and from 0 to 3% by weight of silicon, the remainder to 100% by weight being iron. The chromium-nickel stainless steels are advantageously used in the form of the packings described above, preferably in the form of Raschig rings.

Surprisingly, better results were obtained in the presence of air with dense-sintered alumina or alumina/silica packings which have non-porous surfaces, or with high temperature corrosion-resistant stainless steel packings, than with the porous catalyst packings described in the literature.

The present invention furthermore relates to the use, for the first time, of these moldings of alumina subjected to final sintering or alumina/silica mixtures or of chromium nickel stainless steels in the cleavage of formamide under the stated conditions in the presence of from 0.1 to 10% by volume, based on the gaseous formamide, of air.

Other advantages of the moldings are the corrosion resistance, the stability to thermal cycling and the good thermoconductivity, abrasion resistance and strength. Using moldings of this type, e.g. Raschig rings or saddle packings, optimum residence times and space-time yields can be achieved.

A particular advantage of the moldings according to the invention is that frequent regeneration is unnecessary. It is appropriate to carry out regeneration when the conversion has fallen from 99 to 90%, this being done by stopping the formamide feed and passing air over the moldings at the same temperatures for from 2 to 4 hours. During this procedure, the crack products are completely burned off, so that inhibition of the moldings is completely eliminated.

The novel process is strikingly simple. The relatively high temperatures, the stated pressure ranges, the short residence times and the addition of air give a surprising optimum result in terms of selectivity, conversion and yield. As the pressure increases, not only the selectivity but, surprisingly, also the conversion decreases. As the temperature increases to a maximum of 600° C., the conversion increases and, in contrast to the literature, the selectivity also increases. The lower the residence time, the higher is the selectivity.

There are in general hardly any plants available for a pressure of 1 mbar on a large industrial scale, so that pressures of from 50 to 150, preferably from 80 to 110, mbar constitute an optimum for large-scale industrial processes. The alumina/silica mixtures described above are preferred for the cleavage reaction. However, pure alumina and chromium-nickel stainless steels also give similar results under the same reaction conditions.

According to German Pat. No. 498,733, pure alumina sintered at 1400° C. has already been used; however, without the addition of air but in the presence of gases, such as nitrogen or ammonia, yields of hydrocyanic acid of only 87.5–91.5% are reached, the conversion diminishing substantially after a short time and then constantly decreasing further.

It should also be mentioned that alkali metal-containing aluminosilicate catalysts, for example in the form of pumice, according to German Pat. Nos. 476,662 and 586,861, give low yields, especially during continuous operation, because of the alkali metal content.

EXAMPLE 1

7 kg/h of liquid formamide were passed continuously from below into a vertical tube bundle heat exchanger which was heated by means of a salt bath at 550° C., and were vaporized under reduced pressure of 200 mbar and heated further to 400° C. The evaporator tubes were 140 cm long and had an internal diameter of 16 mm.

150 l/h of air were passed continuously into the superheated formamide vapors.

The superheated gaseous formamide/air mixture was passed from below into a vertical single-tube reactor which was packed with Raschig rings consisting of an aluminosilicate which had been subjected to final sintering, the said reactor being heated externally with a salt bath at about 580° C. The moldings used consisted of an alumina/silica mixture which had been subjected to final sintering and was composed of 93% of $Al_2O_3$ and 7% of $SiO_2$ and in the form of Raschig rings measuring $15\times15\times2$ mm.

The tubes were 140 cm long and had an internal diameter of 53 mm. The superheated formamide vapor was cleaved to give hydrocyanic acid and water under about 130 mbar and at an internal temperature of from 520 to 540° C.

The conversion was 98%, the selectivity 95.9% and the mean residence time 0.07 second.

EXAMPLE 2

17.5 kg/h of liquid formamide were passed continuously from below into a vertical tube bundle heat exchanger which was heated by means of a salt bath at 550° C., and were vaporized under reduced pressure of 250 mbar and heated further to 350° C. The evaporator tubes were 140 cm long and had an internal diameter of 16 mm.

350 l/h of air were passed continuously into the superheated formamide vapors.

The superheated gaseous formamide/air mixture was passed from below into a vertical single-tube reactor which was packed with Raschig rings consisting of an aluminosilicate which had been subjected to final sintering, the said reactor being heated externally with a salt bath at 600° C. The moldings used consisted of an alumina/silica mixture which had been subjected to final sintering and was composed of 93% of $Al_2O_3$ and 7% of $SiO_2$ and in the form of Raschig rings measuring $15\times15\times2$ mm.

The tubes were 140 cm long and had an internal diameter of 53 mm. The superheated formamide vapor was cleaved to give hydrocyanic acid and water under about 130 mbar and at an internal temperature of from 520° to 540° C.

The conversion was 98.6%, the selectivity 96.7% and the mean residence time 0.03 second.

EXAMPLE 3

7.9 kg/h of liquid formamide were passed continuously from below into a vertical tube bundle heat exchanger which was heated by means of a salt bath at 550° C., and were vaporized under reduced pressure of 200 mbar and heated further to 400° C. The evaporator tubes were 140 cm long and had an internal diameter of 16 mm.

140 l/h of air were passed continuously into the superheated formamide vapors.

The superheated gaseous formamide/air mixture was passed from below into a vertical single-tube reactor which was packed with Raschig rings consisting of a high temperature corrosion-resistant stainless steel, the said reactor being heated externally with a salt bath at about 580° C. The stainless steel used was a chromium nickel steel composed of 20% by weight of Cr, 12% by weight of Ni, 2% by weight of Si and 66% by weight of Fe.

The tubes were 140 cm long and had an internal diameter of 53 mm. The superheated formamide vapor was cleaved to give hydrocyanic acid and water under about 130 mbar and at an internal temperature of from 520° to 550° C.

The conversion was 97.5%, the selectivity 94.8% and the mean residence time 0.07 second.

We claim:

1. A process for the cleavage of formamide to give hydrocyanic acid and water, wherein gaseous, superheated formamide together with from 0.1 to 10% by volume of air is introduced into a tube bundle reactor at from 300° to 480° C., under reduced pressure of from 1 to 350 mbar and passed over moldings subjected to final sintering and consisting of from 50 to 100% by weight of alumina and from 50 to 0% by weight of silica, or over high temperature corrosion-resistant chromium-nickel stainless steel moldings; at from 450° to 590° C., the mean residence time being from 0.01 to 0.25 seconds.

2. A process for the cleavage of formamide to give hydrocyanic acid and water, wherein gaseous, superheated formamide together with from 1.0 to 3.0% by volume of air is introduced into a tube bundle reactor at from 300°–400° C., under reduced pressure of from 50–150 mbar and passed over moldings subjected to final sintering and consisting of from 85–95% by weight of alumina and from 15–5% by weight of silica or over chromium-nickel stainless steel moldings comprising from 18–21% by weight of chromium, from 9–13% by weight of nickel and from 0–3% by weight of silicon, the remainder to 100% by weight being iron; at from 500°–540° C., the mean residence time being from 0.01 to 0.05 seconds.

* * * * *

UNITED STATES PATENT AND TRADEMARK OFFICE
CERTIFICATE OF CORRECTION

PATENT NO. : 4,693,877
DATED : September 15, 1987
INVENTOR(S) : Ubbo v. Oehsen, et al It is certified that error appears in the above-identified patent and that said Letters Patent is hereby corrected as shown below:

Title page:

Priority Information deleted form the Letters Patent.
Should read as follows:

- July 19, 1985 [GR] Fed. Rep. of Germany ... P 3525749

Signed and Sealed this

Ninth Day of February, 1988

Attest:

DONALD J. QUIGG

Attesting Officer

Commissioner of Patents and Trademarks